US010625850B2

(12) United States Patent
Schmidt

(10) Patent No.: US 10,625,850 B2
(45) Date of Patent: Apr. 21, 2020

(54) AIRCRAFT LANDING GEAR SHOCK ABSORBER ASSEMBLY

(71) Applicant: Safran Landing Systems UK LTD, Gloucester (GB)

(72) Inventor: Robert Kyle Schmidt, Gloucester (GB)

(73) Assignee: SAFRAN LANDING SYSTEMS UK LTD (GB)

( * ) Notice: Subject to any disclaimer, the term of this patent is extended or adjusted under 35 U.S.C. 154(b) by 333 days.

(21) Appl. No.: 15/683,075

(22) Filed: Aug. 22, 2017

(65) Prior Publication Data

US 2018/0057154 A1 Mar. 1, 2018

(30) Foreign Application Priority Data

Aug. 25, 2016 (EP) .................................... 16185595

(51) Int. Cl.
*B64C 25/60* (2006.01)
*F16F 9/32* (2006.01)
*B64C 25/10* (2006.01)
*F16F 9/48* (2006.01)
*F16F 9/16* (2006.01)

(52) U.S. Cl.
CPC .............. *B64C 25/60* (2013.01); *B64C 25/10* (2013.01); *F16F 9/16* (2013.01); *F16F 9/3242* (2013.01); *F16F 9/3271* (2013.01); *F16F 9/486* (2013.01); *F16F 2230/0023* (2013.01)

(58) Field of Classification Search
CPC ................................. B64C 25/58; B64C 25/60
See application file for complete search history.

(56) References Cited

U.S. PATENT DOCUMENTS

| 2,348,160 A * | 5/1944 | Thornhill ................ B64C 25/60 |
| | | 267/64.15 |
| 2,559,451 A | 7/1951 | McBrearty |
| 2,892,626 A | 6/1959 | Scott |
| 2012/0256050 A1* | 10/2012 | Hilliard ................... B64C 25/34 |
| | | 244/100 R |

OTHER PUBLICATIONS

European Search Report for European Application No. 16185595.2-1757, dated May 3, 2017—8 Pages.

* cited by examiner

*Primary Examiner* — Nicholas McFall
(74) *Attorney, Agent, or Firm* — RatnerPrestia

(57) ABSTRACT

An aircraft landing gear shock absorber assembly having an outer casing having a bore which extends through the outer casing. The bore has a first opening and a second opening. A rod is slidably coupled within the bore such that a first end of the rod projects out of the first opening of the bore, the first end of the rod being arranged to be attached to a wheel assembly. A closure is provided for the second opening of the bore. The bore has a reduced width portion relative to the second opening of the bore, and the rod includes a radially enlarged portion that is wider than the reduced width portion of the bore.

16 Claims, 5 Drawing Sheets

AIRCRAFT LANDING GEAR SHOCK ABSORBER ASSEMBLY

This application claims the benefit of and priority to European Application 16185595.2, filed on Aug. 25, 2016, the contents of which are incorporated herein by reference.

BACKGROUND

A known aircraft landing gear shock absorber assembly comprises an outer casing having a bore which extends partially through the outer casing, and a rod slidably coupled within the bore such that an upper end of the rod is retained in the bore and a lower end of the rod projects out of the bore. The lower end of the rod can comprise a forked yoke arranged to be attached to part of a wheel assembly, such as a bogie beam.

The landing gear is assembled by inserting the upper end of the rod, which defines a radially enlarged piston, into a bore. A gland nut assembly is then fixed within the annulus defined between the bore and rod by screw threads or a series of dowel pins. The gland nut assembly can define a lower bearing and act as a stop arranged to prevent the rod sliding out of the outer casing.

The present inventor has recognised that shock absorbers designed as set out above can be improved in terms of their strength and/or corrosion resistance.

SUMMARY

According to a first aspect of the invention, there is provided an aircraft landing gear shock absorber assembly comprising:
an outer casing having a bore which extends through the outer casing, the bore having a first opening and a second opening;
a rod slidably coupled within the bore such that a first end of the rod projects out of the first opening of the bore, the first end of the rod being arranged to be attached to a wheel assembly;
a closure for the second opening of the bore;
characterised in that the bore comprises a reduced width portion relative to the second opening of the bore; and the rod includes a radially enlarged portion, which can comprise a piston, that is wider than the reduced width portion of the bore.

Thus, the inventor has devised a shock absorber assembly in which the piston and the rod are inserted 'foot first' into the casing bore from above. This enables the casing to be configured such that the bore profile defines a shoulder portion, or other reduced width profile, that acts as an end stop for the piston and therefore replaces the gland nut assembly and out stop tube of known shock absorbers. A greater degree of design freedom is provided for the upper closure, in contrast to a known gland nut which is required to fit within the annulus between the rod and casing, meaning that the upper closure can result in a more robust closure. Also, although a closure for the second opening of the bore must be added after the rod has been inserted into the outer casing and fixing devices may be required to fix the closure in place, the closure and fixing devices can be less prone to corrosion than the seal fixings typically provided at the first opening. This is because, in use, the first opening is located at a lower end of the shock absorber and the second opening is located at an upper end of the shock absorber. As water will run down towards the lower end of the shock absorber, water is more likely to pool around the seal than the closure, so corrosion around the closure can be less of a problem.

The shock absorber assembly may include a seal assembly comprising one or more seals provided within the annulus between the casing and the rod, adjacent the first opening. Where a plurality of seals are provided, they can be arranged in parallel with one another along the annulus. At least the outer most seal, closest to the first opening, can be a scraper seal having a scraping edge arranged to remove dirt and the like from the rod as it passes beyond the scraper seal into the annulus. In embodiments where the shock absorber is a fluid containing shock absorber, such as an oleo-pneumatic shock absorber, one or more of the seals can be dynamic seals arranged to inhibit the flow of shock absorber fluid from the shock absorber in use.

A groove may be formed in the surface of the bore, and the seal assembly may be located in the groove, the seal being arranged to provide a fluid tight seal between the outer casing and the rod. If a plurality of seals are provided, a corresponding plurality of grooves may be provided, one for each seal.

Because the seal is located in an integral groove formed within the bore, this reduces the need to fix the seal in place with separate fixing elements and therefore reduces corrosion. The seal can be fitted in place before insertion of the rod into the outer casing.

The closure may comprise a pressure tight bulkhead fitted to the outer casing at the second opening.

The closure may further comprise an orifice support tube, arranged to project into the bore when the closure is fitted to the outer casing.

Thus, instead of inserting the orifice support tube from the first opening of the outer casing, and retaining the orifice support tube using a ring and nut, the orifice support tube can also be conveniently inserted via the second opening.

The aircraft landing gear assembly can include the wheel assembly; for example, the assembly can comprise a bogie beam having a first side from which a forked yoke extends, the forked yoke being arranged to be removably attached to the first end of the rod; for example, by a pivot pin. Providing a forked yoke which is removably attached to the first end of the rod enables the yoke to be attached to the rod after insertion of the rod into the outer casing, enabling the rod to be inserted into the second opening of the outer casing.

Alternatively, the forked yoke may be formed as a separate fitting arranged to be removably attached to the first end of the rod. For example, the forked yoke may be provided with a tubular extension which extends orthogonal to the axis of the yoke coupling holes (for receiving the bogie pivot), the tubular extension being arranged to be received within or arranged to receive the first end of the rod. The fitting can be fixed in place by a cross bolt or the like.

Alternatively, the first end of the rod can be coupled to any other suitable type of wheel assembly, such as a single axle wheel assembly, or other ground contacting assembly such as a skid.

According to a second aspect of the invention, there is provided an aircraft landing gear including one or more aircraft landing gear shock absorbers according to the first aspect.

According to a third aspect of the invention, there is provided an aircraft including one or more aircraft landing gear according to the second aspect.

According to a fourth aspect of the invention, there is provided a method of producing an aircraft landing gear shock absorber assembly, comprising:

providing an outer casing having a bore which extends through the outer casing, the bore having a first opening and a second opening; and a reduced width portion relative to the second opening of the bore;

providing a rod having a first end and a second end, the second end having a radially enlarged piston that is wider than the reduced width portion of the bore;

inserting the first end of the rod into the second opening of the bore until the first end of the rod projects out of the first opening of the bore; and fitting a closure to the outer casing to close the second opening of the bore.

The advantages of the fourth aspect of the invention are similar to those of the first aspect. As explained above in relation to the first aspect, producing the shock absorber in this way can reduce the likelihood of shock absorber corrosion and/or lead to a more robust shock absorber.

The method may include the step of providing a groove in the surface of the bore and inserting a seal into the groove.

The method may further comprise the steps of: coupling a wheel assembly to the first end of the rod following the step of inserting the first end of the rod into the second opening of the bore until the first end of the rod projects out of the first opening of the bore.

The wheel assembly can comprise a bogie beam and the step of coupling a wheel assembly to the first end of the rod can comprise the steps of:

providing a bogie beam with a forked yoke; and attaching the forked yoke to the first end of the rod via a pivot pin.

BRIEF DESCRIPTION OF THE DRAWINGS

Embodiments of the invention will now be described with reference to the accompanying drawings, in which.

DESCRIPTION OF EXEMPLARY EMBODIMENTS

Figure 1:
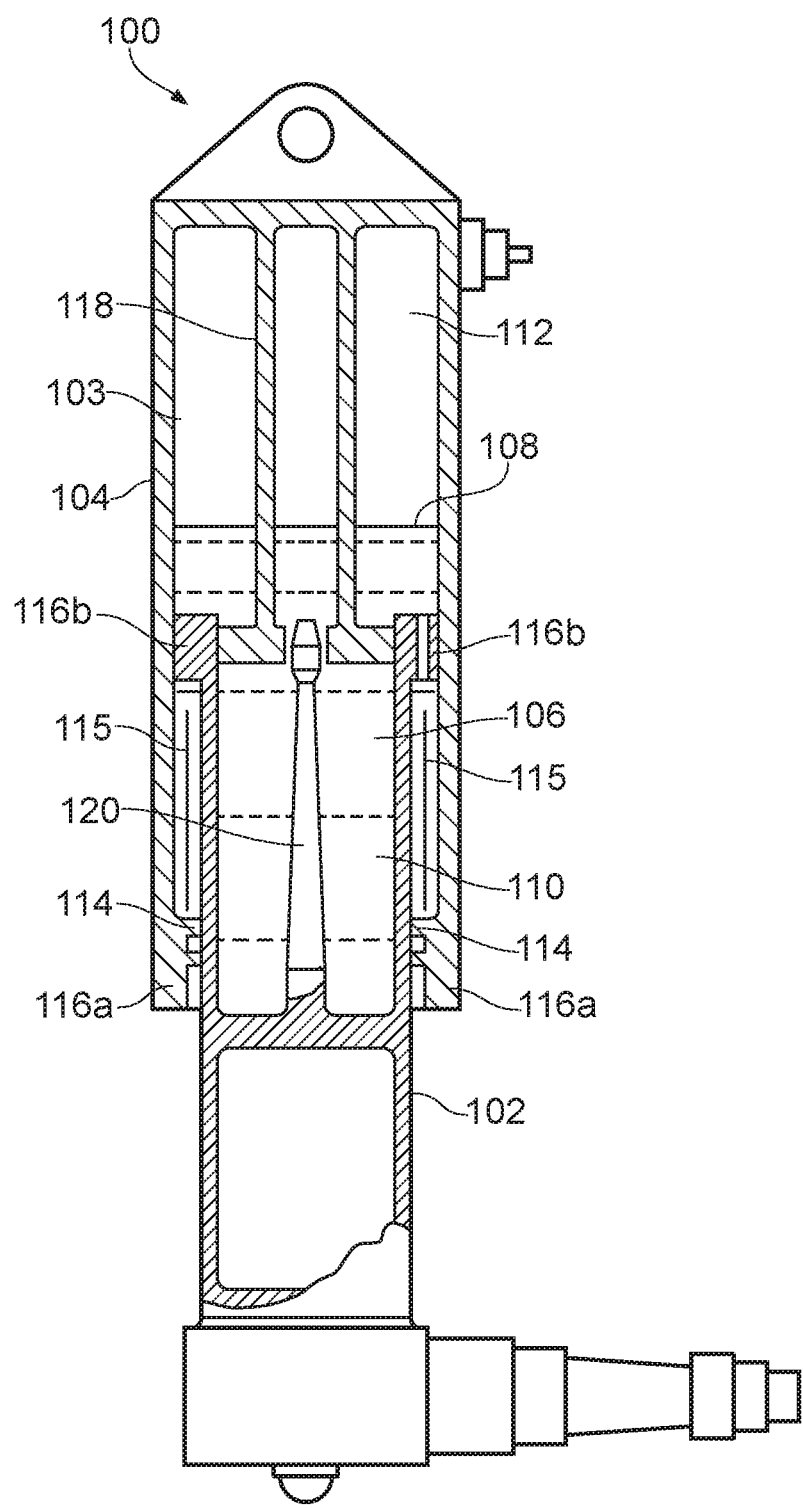
FIG. 1 is a schematic diagram of a known shock absorber.

Referring first to FIG. 1, a conventional shock absorber for a landing gear is shown generally at 100. The shock absorber comprises a rod 102, slidably coupled in a bore 103 formed in an outer casing 104. The rod and outer casing 102, 104 together define an internal cavity 106, which contains a shock absorber fluid 108.

Between the rod and the outer casing are located a dynamic seal 114 and a lower bearing 116, which enable the rod 102 to slide within the outer casing 104 without any leakage of the shock absorber fluid 108 from the internal cavity 106.

When a load is applied to the shock absorber 100, the rod 102 slides into the outer casing 104 and the shock absorber assumes a retracted condition. When a load is removed from the shock absorber 100 the internal pressure of the shock absorber fluid 108 causes the rod 102 to slide out of the outer casing 104 and the shock absorber 100 assumes an extended condition.

The shock absorber 100 also includes an orifice support tube 118 and metering pin 120 for variable damping.

The rod 102 is prevented from sliding out of the outer casing 104 by a lower bearing 116a which projects radially from an inner wall of the outer casing 104 and contacts an outer wall of the rod 102 as the rod 102 slides within the outer casing 104. The rod 102 has a corresponding upper bearing 116b defined by a piston, which projects radially from an upper end of the rod 102 to contact the inner walls of the bore 103. The shock absorber 100 further includes an out stop tube 115 which is a tube portion provided in the annulus between the outer casing 104 and the rod 102 between the upper bearing 116b and the lower bearing 116a. Thus the upper end of the rod 102 is retained within the outer casing 104 as the upper bearing 116b cannot move past the out stop tube 115.

The shock absorber 100 is assembled by inserting the upper end of the rod 102 into the bore 103. In the case of a multi axle landing gear, the rod 102 can be provided with a fork for attachment to a bogie beam or other wheel assembly at its lower end. Once the rod 102 has been inserted into the outer casing 104, the lower bearing 116a and seal 114 are inserted into the annular space of the bore 103 and fixed in place using a gland nut or other suitable fixings.

An aircraft landing gear shock absorber assembly according to an embodiment of the invention is shown generally at 200 in a vertical condition which corresponds to an in-use deployed condition. The shock absorber 200 of FIG. 2 comprises a rod 202 having a first, lower end 202a and a second, upper end 202b, slidably coupled in a bore 203 formed in an outer casing 204. The bore 203 defines a first, lower opening 203a in the outer casing and a second, upper opening 203b. The first end of the rod 202a projects out of the first opening 203a of the bore 203 and is arranged to be attached to a wheel assembly. The rod 202 and outer casing 204 together define an internal cavity 206, which contains a shock absorber fluid 208. The shock absorber assembly 200 operates in a similar manner to the shock absorber 100 of FIG. 1.

The bore 203 is machined internally to provide a reduced width portion 210 at which the bore 203 has a reduced cross-section relative to the second opening 203b. The term cross section as used herein describes a cross section that is orthogonal to the longitudinal axis of the bore 203 and/or rod 202. The rod 202 has a corresponding piston 212 which has a cross section that is larger in diameter than the reduced width portion 210 of the bore 203. The piston 212 is located at the second end of the rod, which is the section of the rod 202 that is retained in the outer casing 204 during operation of the shock absorber assembly 200. In embodiments where the bore does not have a circular cross section, the term diameter can refer to a hydraulic diameter.

Figure 2:
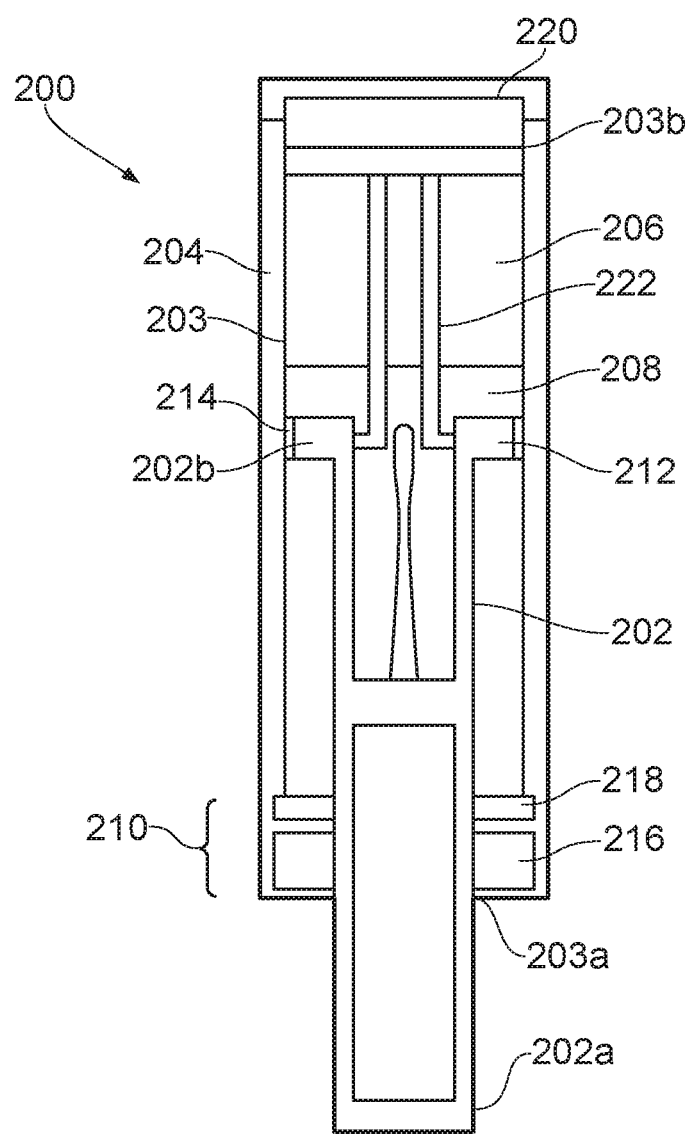
FIG. 2 is a schematic diagram of a shock absorber according to an embodiment of the invention.

Thus, in the shock absorber assembly of FIG. 2, the rod 202 is prevented from sliding out of the outer casing 204 because the piston 212 cannot move past the reduced width portion 210 of the bore 203. In use, when the shock absorber assembly 200 assumes an extended condition, the piston 212 can contact the reduced width portion 210.

The piston 212 comprises an upper bearing 214 surrounding an outer edge of the piston 212, arranged to bear against the walls of the bore 203, but in some embodiments the piston may not comprise an upper bearing, the bearing instead being provided on the inner wall of the outer casing 204.

The portion of the rod 202 between the first end of the rod 202a and the piston 212 has a smaller cross section than the reduced width portion 210 of the bore 203 such that the rod 202 can be inserted into the bore 203 through the second opening 203b of the bore 203 until the first end of the rod 202a projects out of the first opening 203a of the bore 203. The rod is prevented from passing further through the bore 203 by the piston 212 contacting the reduced width portion 210.

The piston 212 is located at the extreme end of the second end 202b of the rod. However, the skilled person will appreciate that in some embodiments the piston or other stop portion 212 could be located at a different point along the section of the rod 202 which is retained within the outer casing 204 when the shock absorber assembly is in use.

A lower bearing 218 is located adjacent the second opening of the bore 203b. The lower bearing 218 is located in a groove formed in the surface of the bore 203. The lower bearing 218 provides a surface against which the rod 203 bears as it moves relative to the outer casing 204 between the extended and retracted conditions.

In the embodiment shown in FIG. 2, a seal assembly 216 is also provided adjacent the second opening, closer to the second opening than the bearing 218. The seal assembly 216 comprises one or more dynamic seals and an outer scraper seal. The seal assembly 216 is located in one or more grooves formed in the surface of the bore 203. The seal assembly 216 provides a fluid tight seal between the rod 202 and the outer casing 204 to prevent leakage of shock absorber fluid. In some embodiments, the seal assembly 216 may be arranged to be separate from the bearing 218. It will be appreciated in embodiments where the shock absorber is not a fluid containing shock absorber (e.g. magnetic) then seals may not be required, although a scraper seal may still be provided.

The second opening 203b of the bore 203 is sealed with a closure 220, which prevents shock absorber fluid from leaking out of the second opening 203b. In the embodiment shown in FIG. 2, the closure 220 comprises a pressure tight bulkhead which is threaded and screws onto corresponding threads in the bore 203 However, the skilled person would appreciate that the closure could be fitted in place in other ways. For example, in some embodiments the closure may be inserted and then held in place with a retaining ring.

In the illustrated embodiment the closure 220 has an orifice support tube 222 attached. That is, the orifice support tube 222 is inserted into the outer casing 204 through the second opening 203b and can then be retained in place by a retaining ring or the like (not shown). In use, internal pressure in the shock absorber will force the orifice support tube against the retaining ring. A securing nut (not shown) can optionally be provided to ensure that the support tube remains securely in place. In other embodiments the orifice support tube can be integrally formed with the closure 220, or the metering pin and support tube assembly can be omitted.

Figure 5:
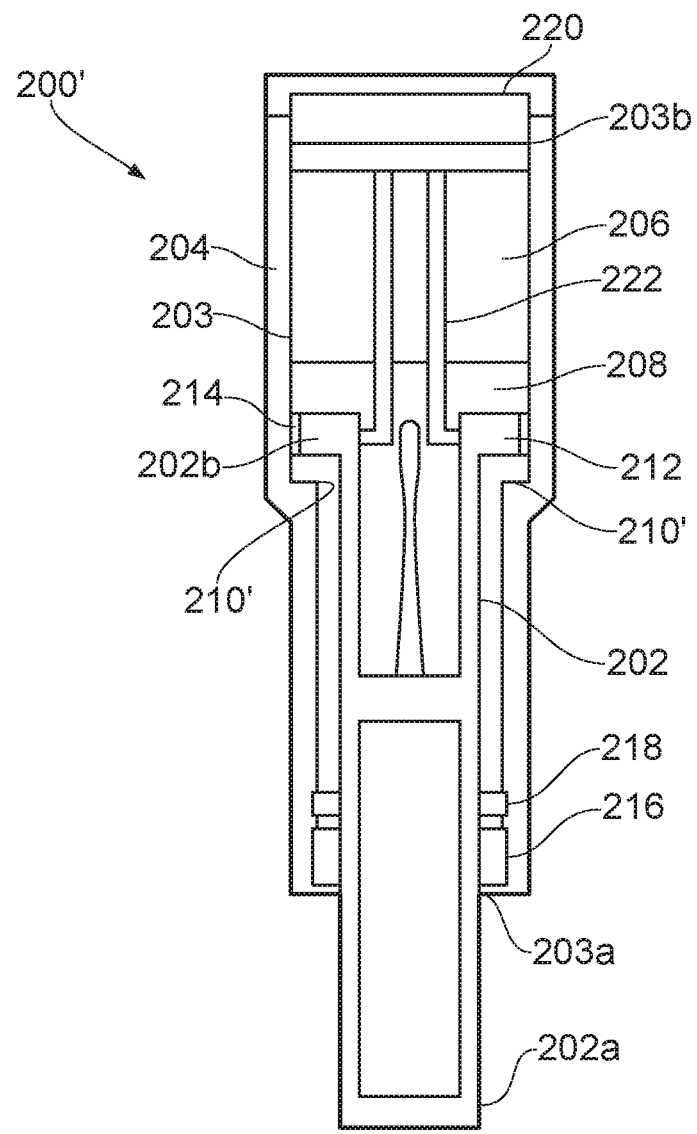
FIG. 5 is a schematic diagram of a shock absorber according to a further embodiment of the invention.

While in the shock absorber assembly of FIG. 2, the rod 202 is prevented from sliding out of the outer casing 204 because the piston 212 cannot move past the reduced width bearing portion 210 of the bore 203, in other embodiments such as the shock absorber 200' of FIG. 5, the reduced width portion 210' can be defined by the casing wall and located at any position in the bore 203. The location of the reduced width portion 210' can be chosen based on the degree of extension of the shock absorber that is required. Thus, an out stop tube is not required.

Figure 3:
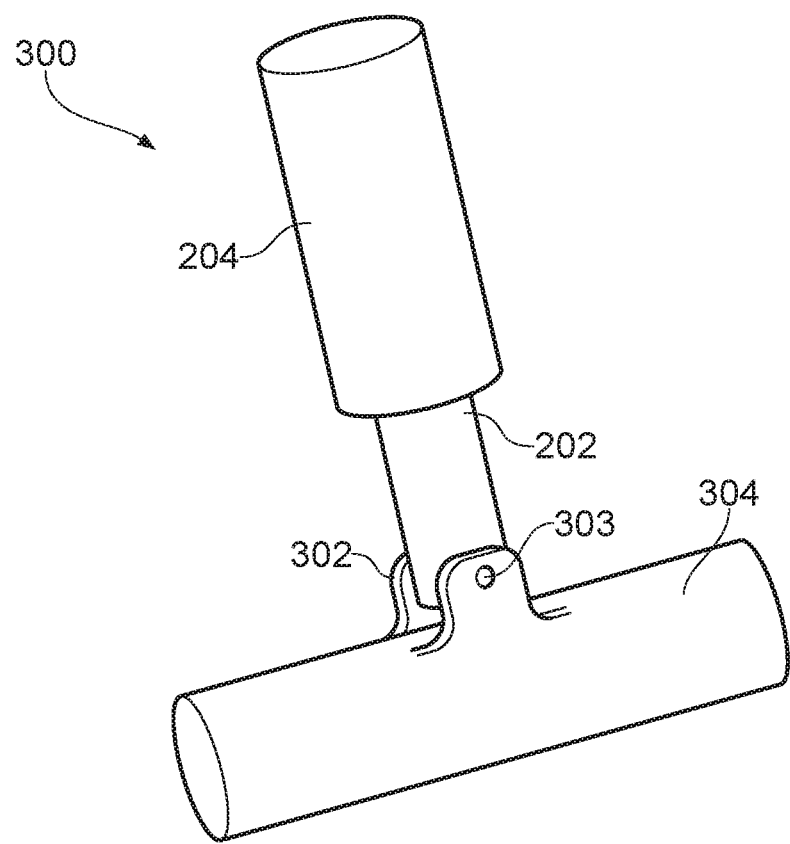
FIG. 3 is a schematic diagram of a shock absorber according to a further embodiment of the invention.

FIG. 3 shows an aircraft landing gear shock absorber assembly 300 according to an embodiment of the invention. The assembly 300 shown in FIG. 3 is similar to the assemblies described with reference to FIGS. 2 and 5. However, the assembly shown in FIG. 3 also includes a bogie beam 304 having a forked yoke 302 attached, the forked yoke being removably attached to the first end of the rod 202 via a pivot pin 303. Alternatively, the forked yoke may be formed as a separate fitting arranged to be removably attached to the first end of the rod. For example, the forked yoke may be provided with a tubular extension which extends orthogonal to the axis of the yoke coupling holes (for receiving the bogie pivot), the tubular extension being arranged to be received within, or arranged to receive, the first end of the rod. The fitting can be fixed in place by a cross bolt or the like.

Figure 4:
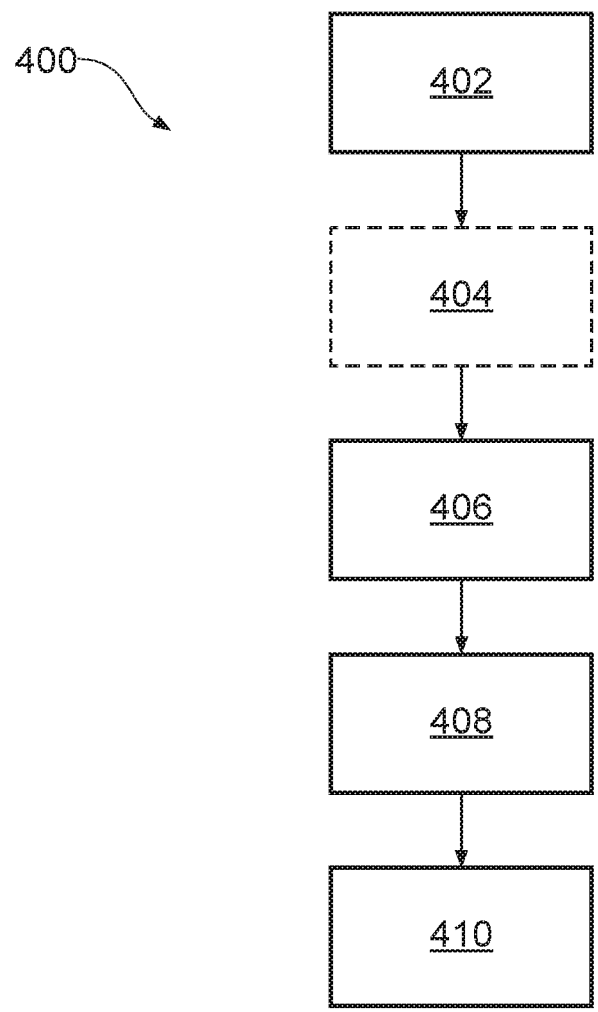
FIG. 4 is a schematic diagram of a method of producing a shock absorber according to an embodiment of the invention.

In FIG. 4, a method of assembling the shock absorber of FIG. 2 is shown generally at 400.

At step 402 an outer casing 203 is provided having a bore which extends through the entire length of the outer casing, the bore having a first, lower opening and a second, upper opening and a reduced width portion having a reduced cross-section relative to the second opening 203b of the bore 203. In the embodiment shown in FIGS. 2 and 3, the reduced width portion 210 is formed integrally in the bore 203.

At step 404, a groove is optionally provided in the surface of the bore and seal assembly 216 is inserted into the groove.

At step 406 a rod 202 is provided having a first, lower end and a second, upper end having a radially enlarged piston 212. The piston 212 may be attached to the rod 202 but is preferably integrally formed with the rod 202.

At step 408 the first end of the rod is inserted into the second opening 203b of the bore 203 until the first end of the rod 202 projects out of the first opening 203a of the bore.

At step 410, a closure 220 is fitted to the outer casing to close the second opening 203b of the bore 203. In the embodiment shown in FIGS. 2 and 3, the bore is sealed with a closure 220 that has an attached orifice support tube 222, so that when the closure 220 is fitted in place at the second opening 203b, the orifice support tube 222 projects into the bore 203.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" does not exclude the presence of elements or steps other than those listed in any claim or the specification as a whole. The singular reference of an element does not exclude the plural reference of such elements and vice-versa. Parts of the invention may be implemented by means of hardware comprising several distinct elements. The mere fact that certain measures are recited in mutually different dependent claims does not indicate that a combination of these measures cannot be used to advantage.

The invention claimed is:

1. An aircraft landing gear shock absorber assembly comprising:
   an outer casing having a bore which extends through the outer casing, the bore having a first opening and a second opening;
   a rod extending from a first end to a second end, the rod being slidably coupled within the bore such that the first end of the rod projects out of the first opening of the bore, the first end of the rod being arranged to be coupled to a wheel assembly;
a closure for the second opening of the bore; and
a seal assembly between the outer casing and the rod adjacent the first opening,
wherein the shock absorber is a fluid containing shock absorber and at least one seal of the seal assembly comprises a fluid seal between the outer casing and the rod,
the bore comprising a reduced width portion having a reduced width relative to the second opening of the bore; and
the rod includes a radially enlarged portion that is wider than the reduced width portion of the bore, the radially enlarged portion being located between the closure for the second opening and the reduced width portion of the bore when the rod is slidably coupled within the bore, the radially enlarged portion being located at the second end of the rod.

2. The aircraft landing gear according to claim 1, wherein each of one or more seals within the seal assembly is mounted in a groove formed in the surface of the bore.

3. The aircraft landing gear according to claim 1, wherein an outer most seal of the seal assembly is a scraper seal arranged to scrape the rod as the rod slides within the bore.

4. The aircraft landing gear shock absorber assembly according to claim 1, wherein the closure comprises a pressure tight bulkhead fitted to the outer casing at the second opening.

5. The aircraft landing gear shock absorber assembly according to claim 4 wherein the closure further comprises an orifice support tube, arranged to project into the bore when the closure is fitted to the outer casing.

6. The aircraft landing gear shock absorber assembly according to claim 1, further comprising a bogie beam coupled to a forked yoke, the forked yoke being removably attached to the first end of the rod.

7. The aircraft landing gear shock absorber assembly according to claim 1, wherein the reduced width portion is closer to the middle of the outer casing than to the first opening.

8. The aircraft landing gear shock absorber assembly according to claim 1, wherein when the shock absorber is in use, the first opening is located at a lower end of the shock absorber and the second opening is located at an upper end of the shock absorber.

9. The aircraft landing gear shock absorber assembly according to claim 1, wherein the reduced width portion comprises the seal assembly.

10. The aircraft landing gear shock absorber assembly according to claim 9, wherein the reduced width portion is formed integrally with the bore.

11. An aircraft landing gear including an aircraft landing gear shock absorber assembly as the main shock absorbing strut, the aircraft landing gear shock absorber assembly comprising an outer casing having a bore which extends through the outer casing, the bore having a first opening and a second opening;
a rod slidably coupled within the bore such that a first end of the rod projects out of the first opening of the bore, the first end of the rod being arranged to be coupled to a wheel assembly;
a closure for the second opening of the bore; and
a seal assembly between the outer casing and the rod adjacent the first opening,
wherein the shock absorber is a fluid containing shock absorber and at least one seal of the seal assembly comprises a fluid seal between the outer casing and the rod,
the bore comprising a reduced width portion having a reduced width relative to the second opening of the bore; and
the rod includes a radially enlarged portion that is wider than the reduced width portion of the bore, the radially enlarged portion being located between the closure for the second opening and the reduced width portion of the bore when the rod is slidably coupled within the bore.

12. An aircraft including an aircraft landing gear including an aircraft landing gear shock absorber assembly as the main shock absorbing strut, the aircraft landing gear shock absorber assembly comprising an outer casing having a bore which extends through the outer casing, the bore having a first opening and a second opening;
a rod slidably coupled within the bore such that a first end of the rod projects out of the first opening of the bore, the first end of the rod being arranged to be coupled to a wheel assembly;
a closure for the second opening of the bore;
a seal assembly between the outer casing and the rod adjacent the first opening,
wherein the shock absorber is a fluid containing shock absorber and at least one seal of the seal assembly comprises a fluid seal between the outer casing and the rod,
the bore comprising a reduced width portion having a reduced width relative to the second opening of the bore; and
the rod includes a radially enlarged portion that is wider than the reduced width portion of the bore, the radially enlarged portion being located between the closure for the second opening and the reduced width portion of the bore when the rod is slidably coupled within the bore.

13. A method of producing an aircraft landing gear shock absorber assembly, the method comprising:
providing an outer casing having a bore which extends through the entire length of the outer casing, the bore having a first opening, a second opening, and a reduced width portion having a reduced width relative to the second opening of the bore;
providing a rod having a first end and a second end, the second end having a radially enlarged portion that has an axial cross-section with a greater diameter than the reduced width portion of the bore;
inserting the first end of the rod into the second opening of the bore until the first end of the rod projects out of the first opening of the bore; and
fitting a closure to the outer casing to close the second opening of the bore;
wherein the shock absorber assembly further comprises a seal assembly between the outer casing and the rod adjacent the first opening, and
wherein the shock absorber is a fluid containing shock absorber and at least one seal of the seal assembly comprises a fluid seal between the outer casing and the rod.

14. The method of producing an aircraft landing gear shock absorber assembly according to claim 13, further comprising providing a groove in the surface of the bore and inserting a seal assembly into the groove prior to the step of inserting the first end of the rod into the second opening of the bore until the first end of the rod projects out of the first opening of the bore.

15. The method of producing an aircraft landing gear shock absorber assembly according to claim 13 further comprising coupling a wheel assembly to the first end of the rod following the step of inserting the first end of the rod into the second opening of the bore until the first end of the rod projects out of the first opening of the bore.

16. The method of producing an aircraft landing gear shock absorber assembly according to claim 15 whereby the wheel assembly comprises a bogie beam and the step of coupling a wheel assembly to the first end of the rod comprises the steps of:

providing a bogie beam with a forked yoke; and attaching the forked yoke to the first end of the rod via a pivot pin.

\* \* \* \* \*